United States Patent
Yeh (10) Patent No.: US 9,388,915 B1
(45) Date of Patent: Jul. 12, 2016

(54) REPLACEABLE FAUCET HANDLE

(71) Applicant: Yiu-Kuei Yeh, Changhua (TW)

(72) Inventor: Yiu-Kuei Yeh, Changhua (TW)

(73) Assignee: Alexander Yeh Industry Co Ltd., Changhua (TW)

( * ) Notice: Subject to any disclaimer, the term of this patent is extended or adjusted under 35 U.S.C. 154(b) by 0 days.

(21) Appl. No.: 14/701,853

(22) Filed: May 1, 2015

(51) Int. Cl.
*F16K 31/00* (2006.01)
*F16K 31/60* (2006.01)

(52) U.S. Cl.
CPC ................... *F16K 31/602* (2013.01)

(58) Field of Classification Search
CPC ............... Y10T 137/6014; Y10T 137/6024; Y10T 137/9464; Y10T 16/506; Y10T 16/30; Y10T 16/24; Y10T 74/2084; Y10T 74/20732; Y10T 74/20864; Y10T 403/12; Y10T 403/1649; F16K 31/60; F16K 31/602; F16K 31/605; F16K 11/207; F16K 19/006; E03C 1/0412; G05G 1/12; G05G 1/06; G05G 1/04; G05G 1/08
See application file for complete search history.

(56) References Cited

U.S. PATENT DOCUMENTS

| | | | | | |
|---|---|---|---|---|---|
| 4,065,216 | A | * | 12/1977 | Nelson | G05G 1/08 16/441 |
| 4,616,673 | A | * | 10/1986 | Bondar | F16K 31/60 137/315.15 |
| 4,794,945 | A | * | 1/1989 | Reback | F16K 31/60 137/315.12 |
| 4,842,009 | A | * | 6/1989 | Reback | F16K 31/60 137/315.15 |
| 4,876,766 | A | * | 10/1989 | Cohen | F16K 31/602 16/426 |
| 5,025,826 | A | * | 6/1991 | Schoepe | F16K 31/60 137/315.15 |
| 6,438,771 | B1 | * | 8/2002 | Donath, Jr. | F16K 31/60 137/359 |
| 6,666,227 | B2 | * | 12/2003 | Erickson | E03C 1/042 137/270 |
| 7,231,935 | B2 | * | 6/2007 | Huang | F16K 27/06 137/315.15 |
| 8,266,767 | B1 | * | 9/2012 | Huang | F16K 31/60 16/436 |
| 8,459,145 | B2 | * | 6/2013 | Huang | F16K 31/605 137/315.15 |
| 8,479,609 | B2 | * | 7/2013 | Huang | F16K 27/06 137/315.15 |
| 8,839,813 | B2 | * | 9/2014 | Huang | F16K 31/60 137/315.12 |
| 9,217,512 | B2 | * | 12/2015 | Huang | F16K 31/60 |
| 2005/0236047 | A1 | * | 10/2005 | Thomas | E03C 1/04 137/359 |
| 2012/0280160 | A1 | * | 11/2012 | Huang | F16K 31/00 251/292 |

* cited by examiner

*Primary Examiner* — Chuck Mah
(74) *Attorney, Agent, or Firm* — Che-Yang Chen; Law Offices of Scott Warmuth (57) ABSTRACT

A replaceable faucet handle may include a handle, a handle body, a first adapter unit, a second adapter unit and a nut. A base is located on one side of the handle, and a recessed portion is formed on the bottom thereof with a screw hole. The handle body comprises a space formed therein, and a block configured to connect to the recessed portion is formed on the top thereof. The first adapter unit has two first driving blocks, a first through hole formed on a central portion thereof for penetration, and a first cutting edge formed on one side of the first through hole. The second adapter unit has two second driving blocks, a second through hole formed on a central portion thereof for penetration, and three connected second cutting edges formed on one side of the second through hole.

5 Claims, 9 Drawing Sheets

PRIOR ART

REPLACEABLE FAUCET HANDLE

FIELD OF THE INVENTION

The present invention relates to a replaceable faucet handle, and more particularly to a replaceable faucet handle that can be used for different types of faucets.

BACKGROUND OF THE INVENTION

Figure 8:
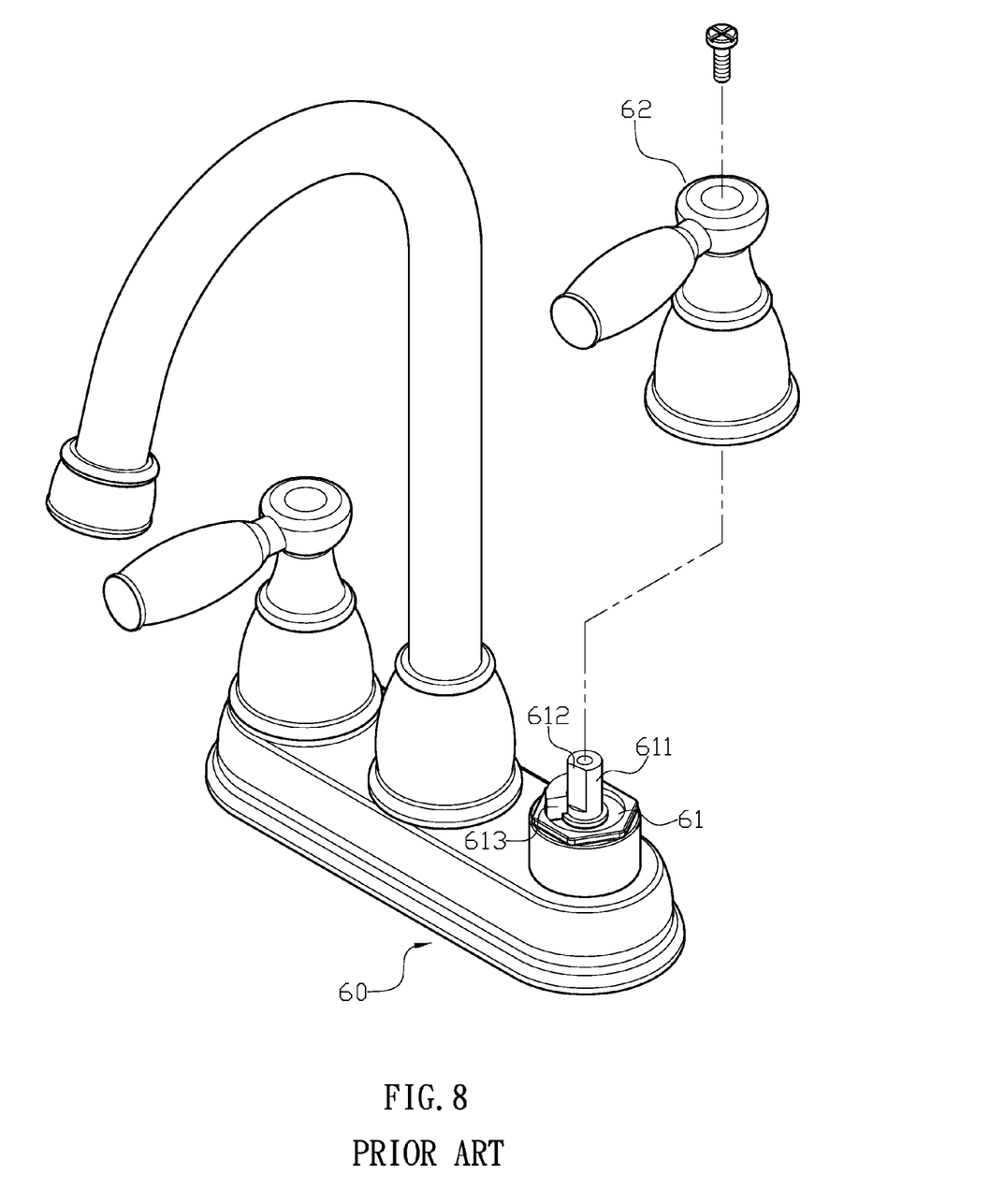
FIG. 8 is a prior art.

Conventionally, a replaceable faucet handle for DELTA series faucet (as shown in FIG. 8) has at least a first control valve (61), and a first valve stem (611) having a first cutting edge (612) on a periphery thereof extending from a top portion of the first control valve (61) to connect to a first handle (62). The first handle (62) is secured on the first valve stem (611) by the first cutting edge (612) and is operated to control the on/off mode of the faucet and the water flow.

Figure 9:
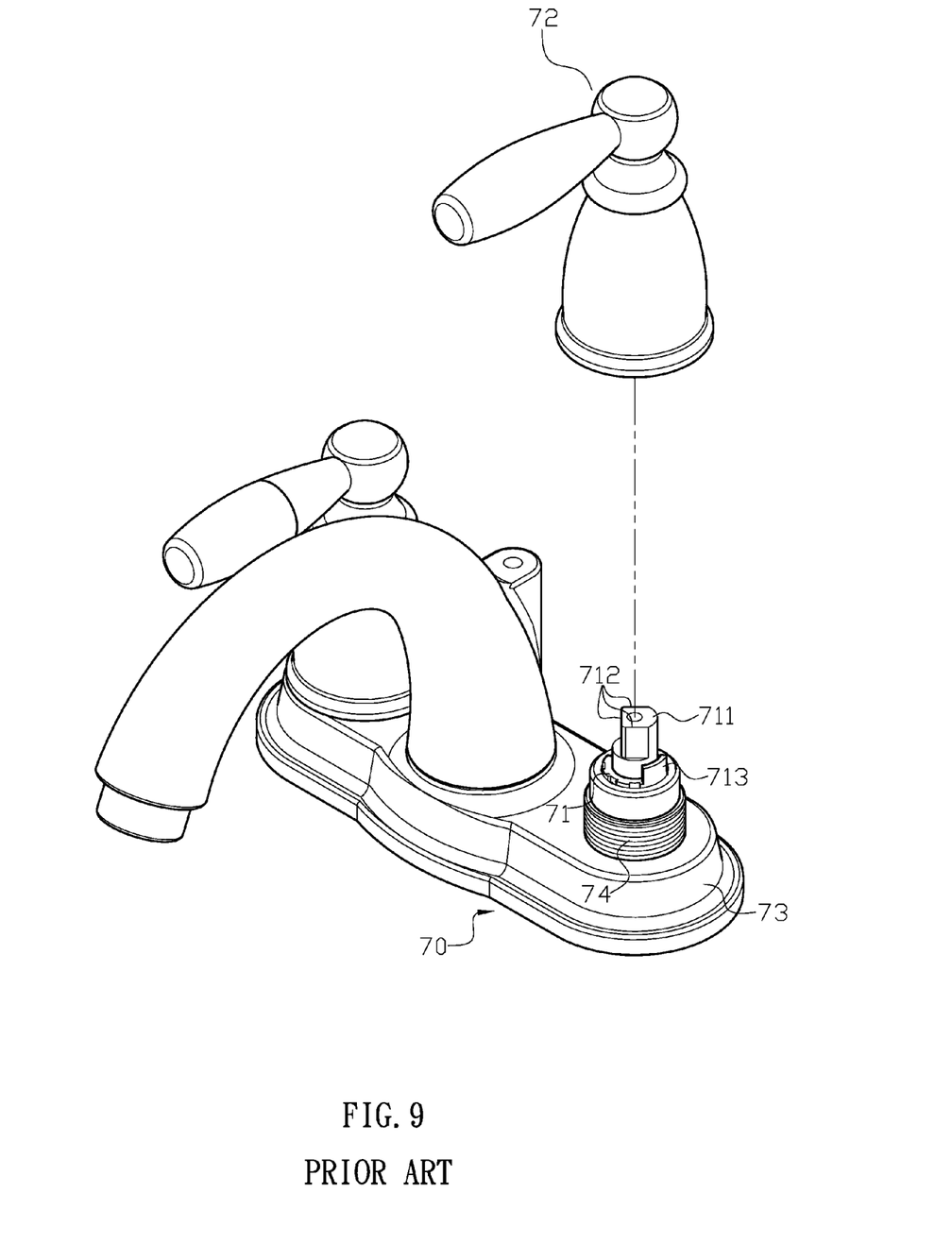
FIG. 9 is a prior art.

A conventional replaceable faucet handle of MOEN series faucet (as shown in FIG. 9) has at least a second control valve (71), and a second valve stem (711) having three second cutting edges (712) on a periphery thereof extending from a top portion of the second control valve (71) to connect to a second handle (72). The second handle (72) is secured on the second valve stem (711) by the three second cutting edges (712) and is operated to control the on/off mode of faucet and the water flow.

However, conventional replaceable faucet handles are disadvantageous because: (i) the formation of the first valve stem (611) and the second valve stem (711) are different, so the same valve stem cannot be used for the different replaceable faucet handles. It is inconvenient for customers to replace the faucet by themselves; and (ii) a shell (73) of MOEN series faucet is secured on a faucet body (70) by fastening the handle (72) on a top portion thereof, so the shell (73) will be loosened when the handle (72) is disengaged from a valve base (74) in replacement process. Therefore, there remains a need for a new and improved design for a faucet handle configured to be used in at least two different types of faucets to overcome the problems presented above.

SUMMARY OF THE INVENTION

The present invention provides a replaceable faucet handle, which comprises a handle, a handle body, a first adapter unit, a second adapter unit and a nut. A base is located on one side of the handle, and a recessed portion is formed on the bottom thereof with a screw hole. The handle body comprises a space formed therein, and a block configured to connect to the recessed portion is formed on the top thereof. The block has a first screw hole on a periphery thereof, and a stepped hole formed at a top portion thereof penetrates the block to connect to the space. Two driving holes formed on a top portion of the handle body are located between the block and the space, and two vertical boards are formed. The first adapter unit extends two first driving blocks from a top portion thereof, and a first controlling piece is formed along a partial periphery of the bottom thereof, and a first through hole is formed on a central portion thereof for penetration, and a first cutting edge is formed on one side of the first through hole. The second adapter unit extends two second driving blocks from a top portion thereof, and a second controlling piece is formed along a partial periphery of the bottom thereof, and a second through hole is formed on a central portion thereof for penetration, and three connected second cutting edges are formed on one side of the second through hole. Therefore, the replaceable faucet handle of present invention can be used for different types of faucets.

Comparing with conventional replaceable faucet handle, the present invention is advantageous because: (i) by the selection of the first adapter unit and the second adapter unit, the handle and the handle body can be used for two main types of faucets; and (ii) the nut is engaged with a valve base of a faucet body for blocking a shell that preventing the shell from loosening when the second handle is disengaged form the valve base, so the installation of the handle body and the handle will be much easier.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
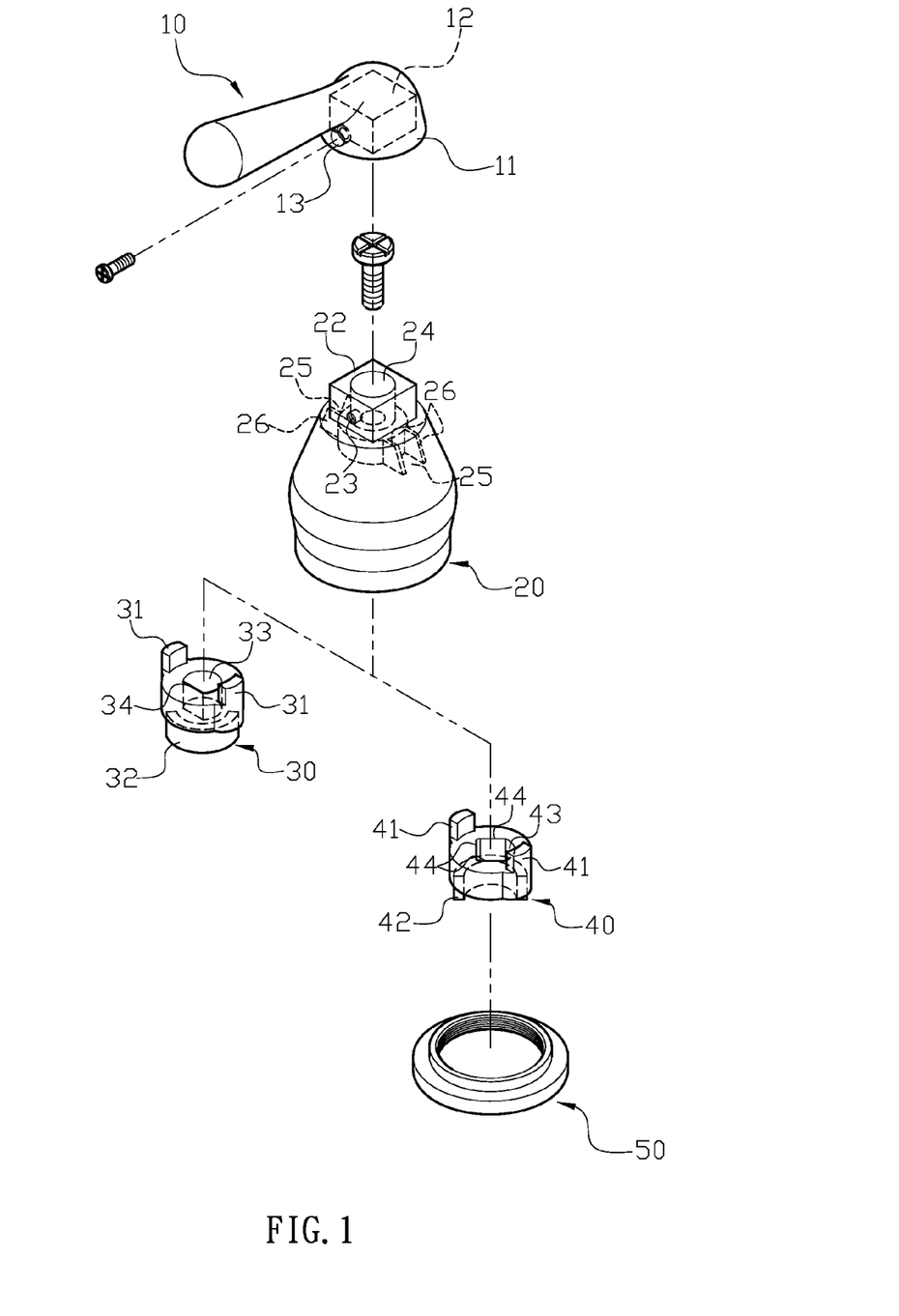
FIG. 1 is a three-dimensional exploded view of the replaceable faucet handle in the present invention.
Figure 2:
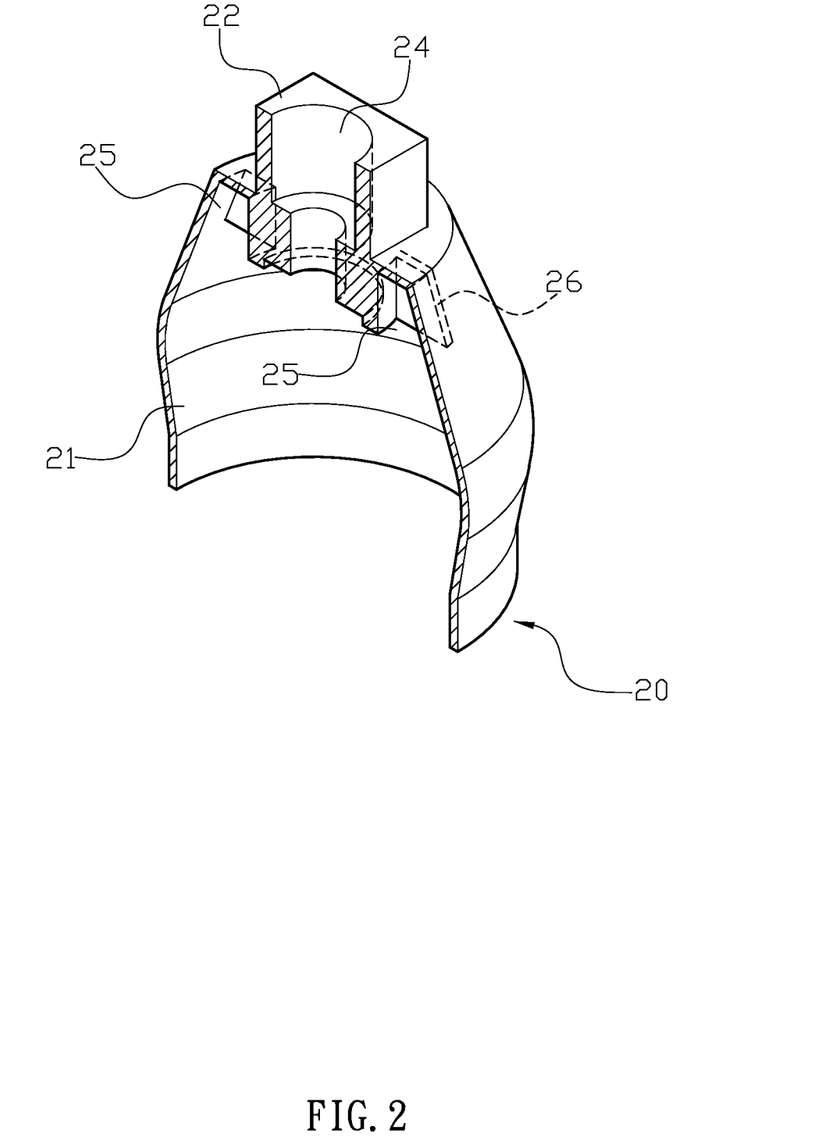
FIG. 2 is a sectional view of the handle body of the replaceable faucet handle in the present invention.
Figure 3:
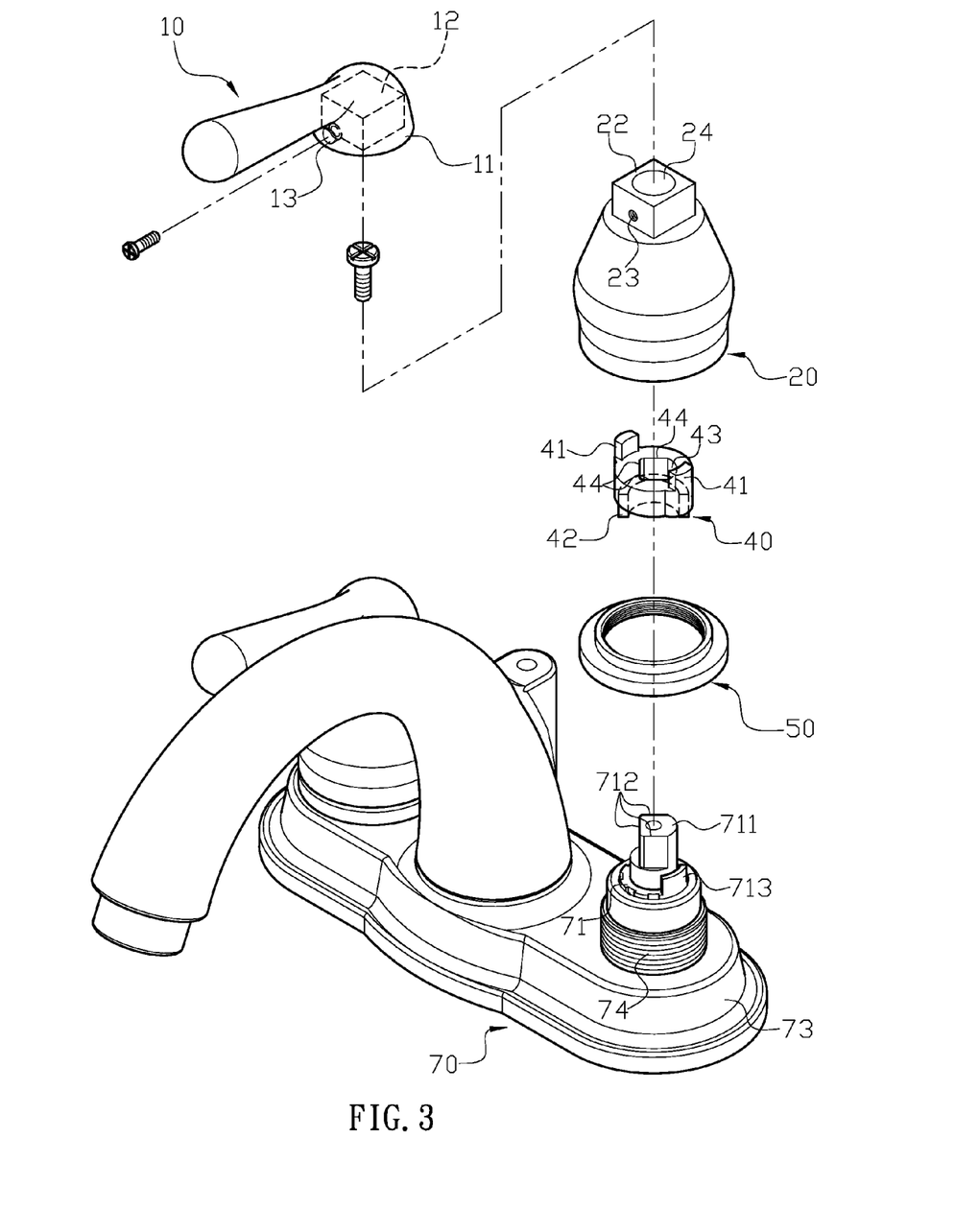
FIG. 3 is a schematic view of the replaceable faucet handle in the present invention during a replacement process.
Figure 4:
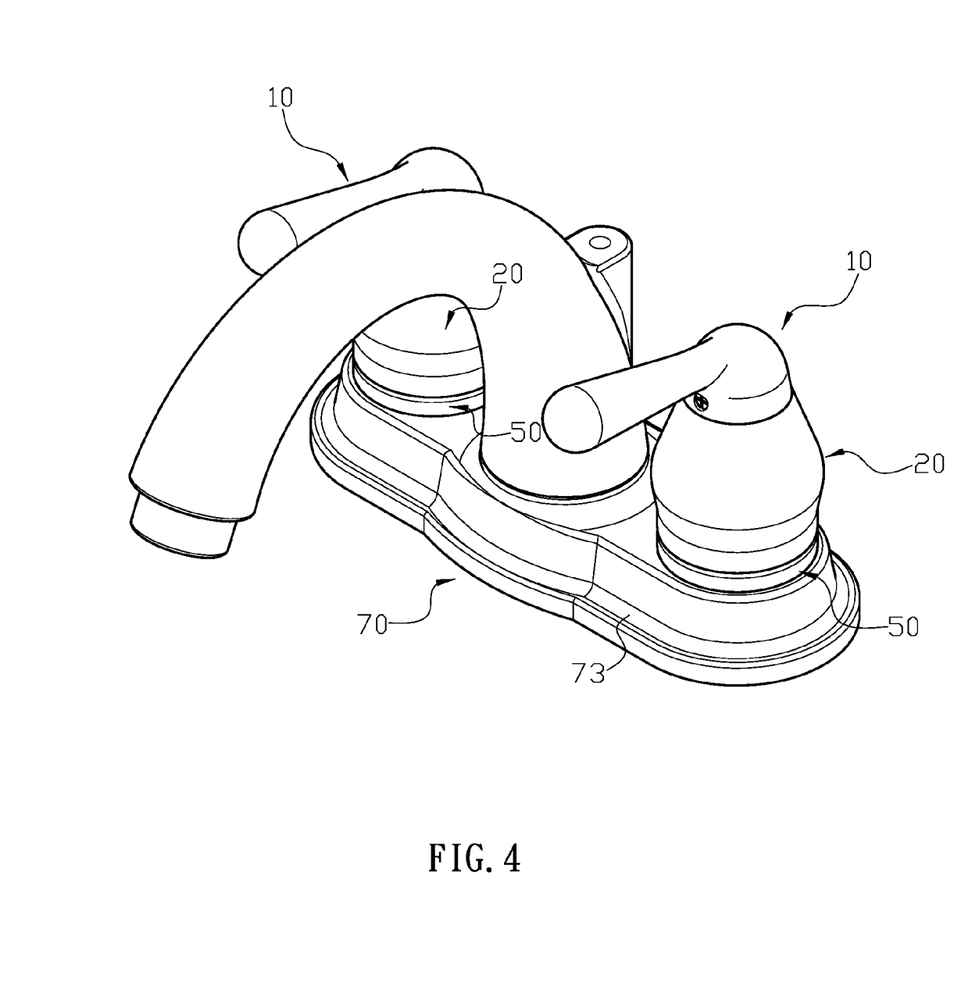
FIG. 4 is a three-dimensional view of the replaceable faucet handle in the present invention after the replacement process.
Figure 5:
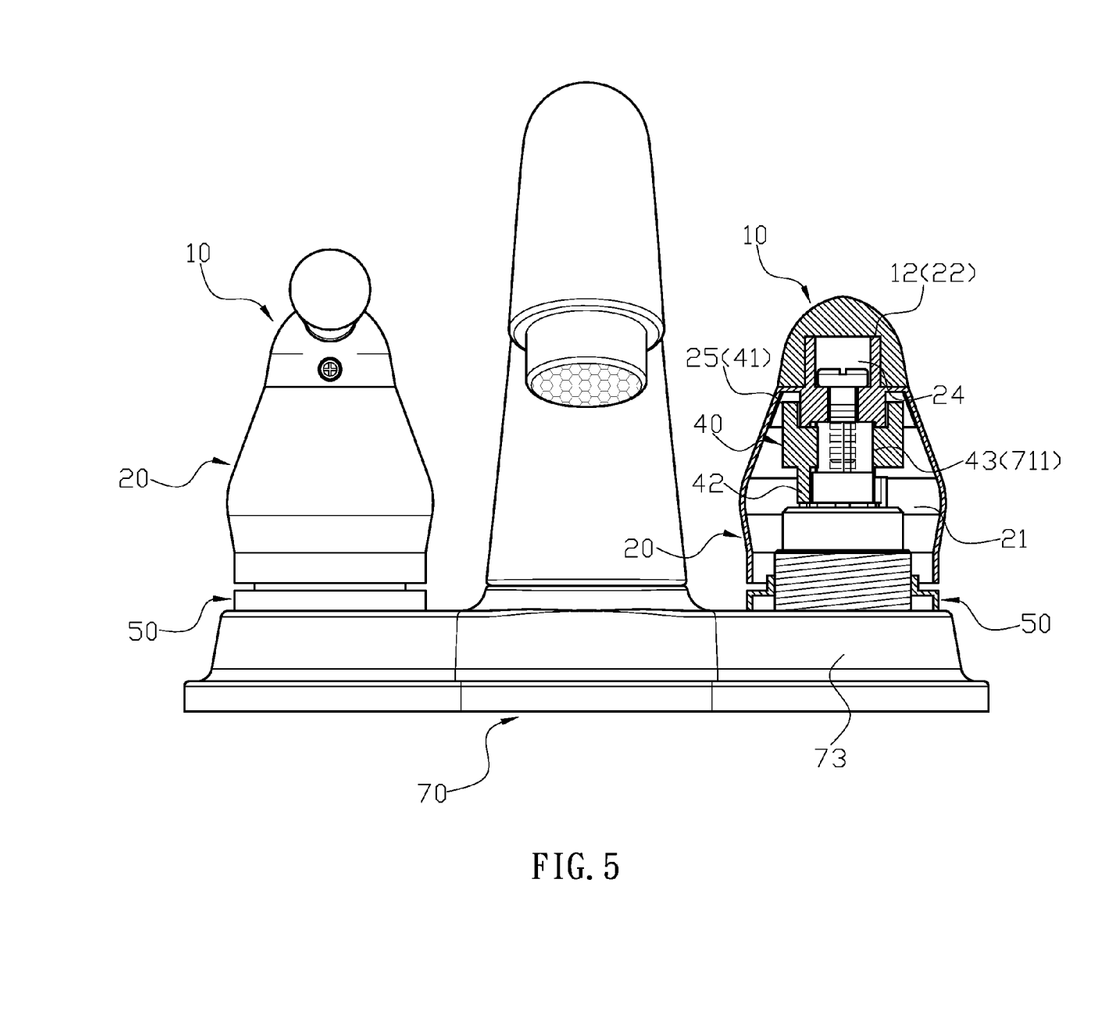
FIG. 5 is a sectional view of the replaceable faucet handle in the present invention after the replacement process.

In order to further understand the goal, characteristics and effect of the present invention, a number of embodiments along with the drawings are illustrated as following:

Referring to FIGS. 1 and 2, the present invention provides a replaceable faucet handle, which comprises a handle (10), a handle body (20), a first adapter unit (30), a second adapter unit (40) and a nut (50). A base (11) is located on one side of the handle (10), and a recessed portion (12) is formed on a bottom portion of the base (11), and a screw hole (13) is formed inside the recessed portion (12). The handle body (20) comprises a space (21) formed therein, and a block (22) configured to connect to the recessed portion (12) is formed on a top portion of the handle body (20). The block (22) has a first screw hole (23) on a periphery thereof, and a stepped hole (24) formed at a top portion thereof penetrating the block (22) to connect to the space (21). Two driving holes (25) formed on a top portion of the handle body (20) are located between the block (22) and the space (21), and a vertical board (26) is formed on both sides to define the driving hole (25). The first adapter unit (30) has two first driving blocks (31) extending upwards from a top portion thereof, and a first controlling piece (32) is formed along a periphery of a bottom portion of the first adapter unit (30). A first through hole (33) is formed on a central portion thereof for penetration, and a first cutting edge (34) is formed on one side of the first through hole (33). The second adapter unit (40) has two second driving blocks (41) extending upwards from a top portion thereof, and a second controlling piece (42) is formed along a periphery of a bottom portion of the second adapter unit (40). A second through hole (43) is formed on a central portion thereof for penetration, and three connected second cutting edges (44) are formed on one side of the first through hole (43).

In one embodiment, the replaceable faucet handle is used for a single-handle faucet.

In another embodiment, the replaceable faucet handles are used for a double-handle faucet.

In a further embodiment, the recessed portion (12) is a square hole to connect with a square block.

Referring to FIGS. 3, 4, 5 and 9 for replacing a MOEN series faucet, a second handle (72) of MOEN series faucet is disengaged from a valve base (74), and a nut (50) is engaged with the valve base (74) of a faucet body (70) for blocking a shell (73), so the nut (50) can prevent the shell (73) from loosening when the second handle (72) is disengaged from the valve base (74). The second adapter unit (40) is then secured on a second valve stem (711) through the second through hole (43), and the second controlling piece (42) of the second adapter unit (40) can evade a second block piece (713), so the second controlling piece (42) and the second block piece (713) can be used to restrict each other to define a maximum angle of rotation between the handle (10) and the handle body (20). The second adapter unit (40) and a second control valve (71) are covered by the space (21) of the handle body (20), and the two driving blocks (41) of the second adapter unit (40) are engaged with the corresponding driving holes (25) of the handle body (20), and the handle body (20) is secured on a top portion of the second valve stem (711) by fastening a screw into the stepped hole (24) thereof. Through the connection between the block (22) and the recessed portion (12), and a screw inserted into the stepped hole (24), the handle (10) is secured on the handle body (20). Namely, through the engagement between the block (22) and the recessed portion (12), the driving blocks (41) and driving holes (25), and the through hole (43) and the second valve stem (711), the second valve stem (711) can be operated by the handle (10) to turn on/off the faucet and control the amount of the water flow.

Figure 6:
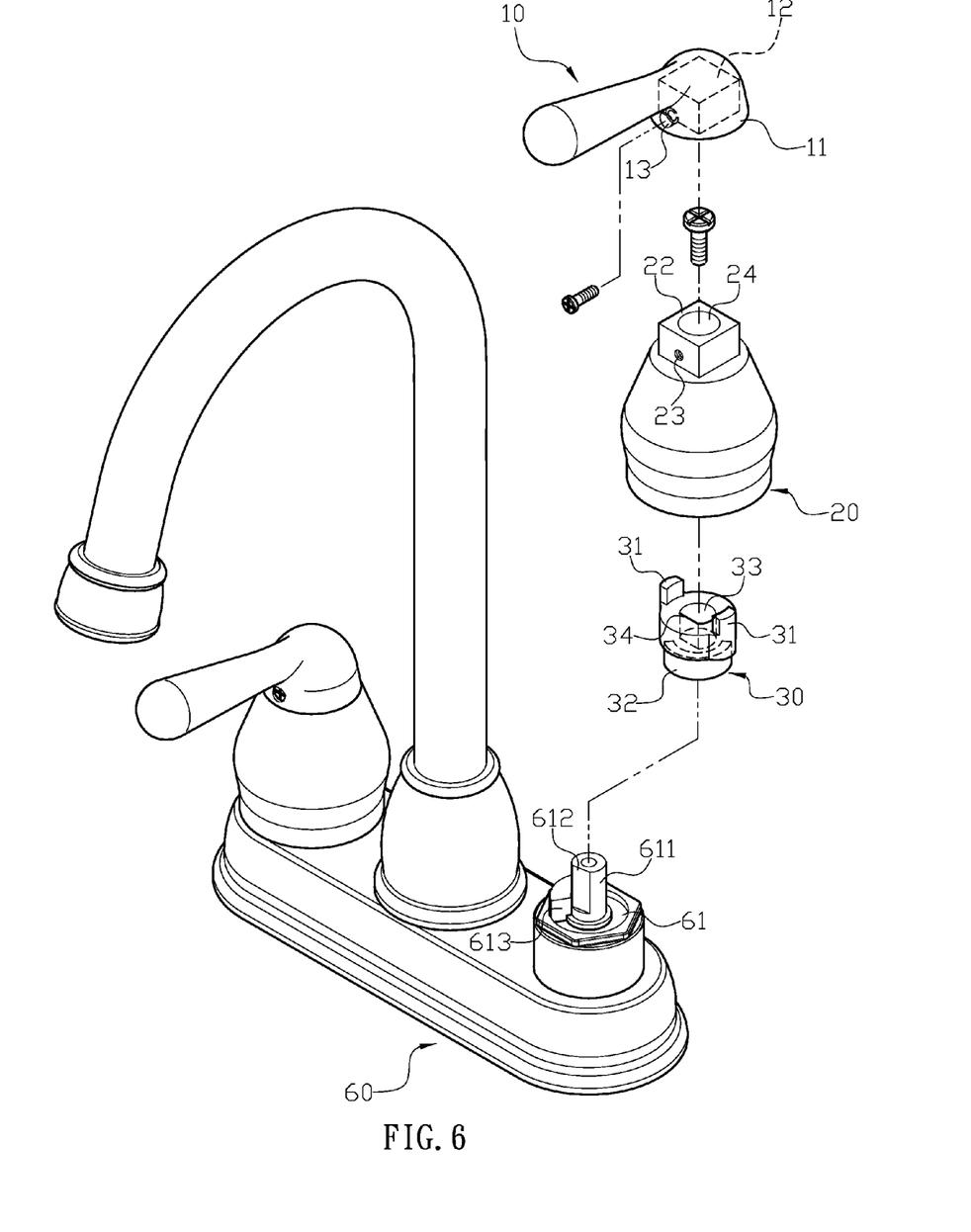
FIG. 6 is a schematic view of another embodiment of the replaceable faucet handle in the present invention during the replacement process.
Figure 7:
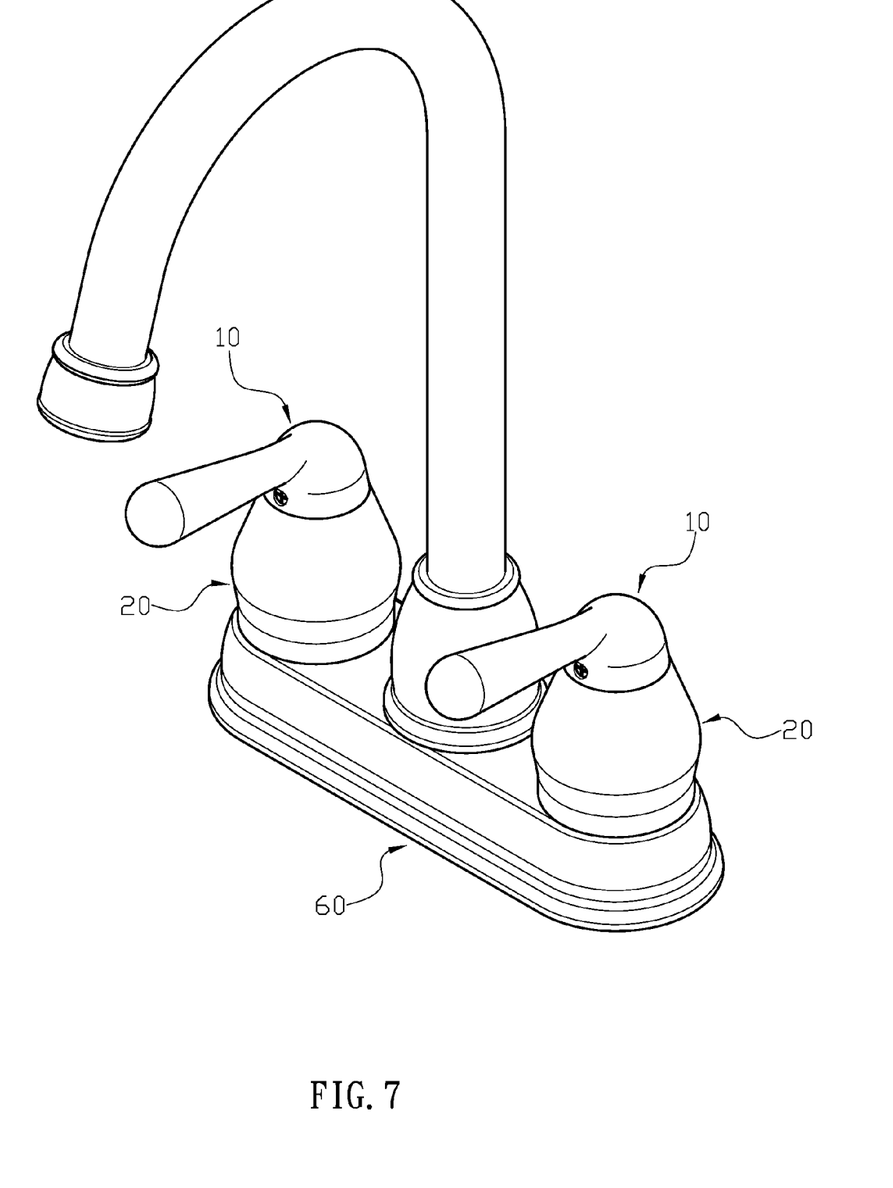
FIG. 7 is a three-dimensional view of another embodiment of the replaceable faucet handle in the present invention after the replacement process.

Referring to FIGS. 6, 7 and 8 for replacing a DELTA series faucet a first handle (62) of DELTA series faucet is disengaged from a first valve stem (611), and the first adapter unit (30) is connected to the handle (10), the handle body (20) and the first valve stem (611), so the first valve stem (611) of DELTA series faucet can be operated by the handle (10) to turn on/off of the faucet and control the amount of the water flow.

Comparing with conventional replaceable faucet handle, the present invention is advantageous because: (i) by the selection of the first adapter unit (30) and the second adapter unit (40), the handle (10) and the handle body (20) can be suitable for two main types of faucets; and (ii) the nut (50) is engaged with a valve base (74) of a faucet body (70) for blocking a shell (73) that preventing the shell (73) from loosening when the second handle (72) is disengaged form the valve base (74), so the installation of the handle body (20) and the handle (10) will be much easier.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A replaceable faucet handle, which is adapted to use with different types of faucets, comprising:
    a handle having a base located on one side thereof, and a recessed portion formed on a bottom portion thereof with a screw hole;
    a handle body having a space, and a block configured to connect to the recessed portion formed on a top portion of the handle body, and the block having a first screw hole on a periphery thereof, and a stepped hole formed at a top portion of the block penetrating the block to the space, and two driving holes formed on a top portion of the handle body located between the block and the space;
    a first adapter unit having two first driving blocks extending upwards from a top portion thereof, and a first controlling piece formed along a periphery of a portion of the first adapter unit, wherein a first through hole is formed on a central portion of the first adapter unit for penetration, and a first cutting edge is formed at one side of the first through hole; and
    a second adapter unit having two second driving blocks extending upwards from a top portion thereof, and a second controlling piece formed along a periphery of a portion of the second adapter unit, wherein a second through hole is formed on a central portion of the second adapter unit for penetration, and three connected second cutting edges are formed at one side of the second through hole.

2. The replaceable faucet handle of claim 1, wherein each of the driving holes is located between the block and the space, and two vertical boards are formed to define the driving hole.

3. The replaceable faucet handle of claim 1, wherein the replaceable faucet handle is used for a single-handle faucet.

4. The replaceable faucet handle of claim 1, wherein the replaceable faucet handles are used for a double-handle faucet.

5. The replaceable faucet handle of claim 1, wherein the recessed portion is a square hole to connect with a square block.

* * * * *